June 26, 1934.  F. H. PIETZSCH ET AL  1,964,137
BRAKE SLACK ADJUSTER
Filed Dec. 24, 1931  3 Sheets-Sheet 2
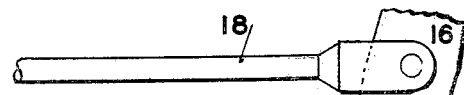
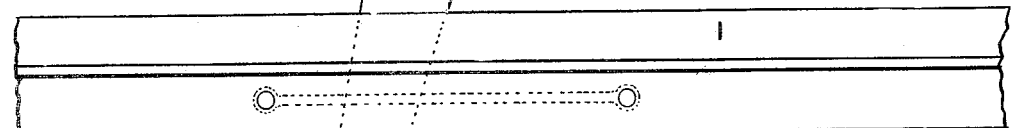
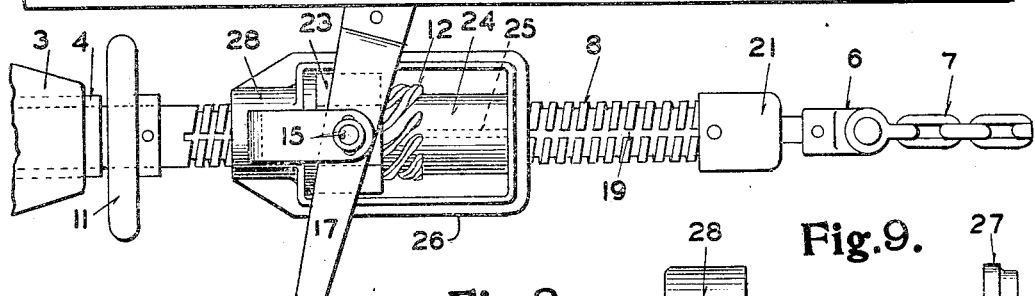
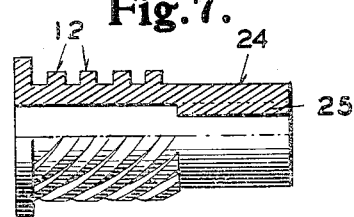
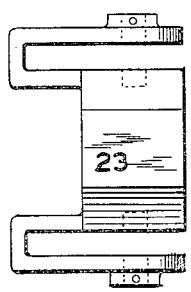
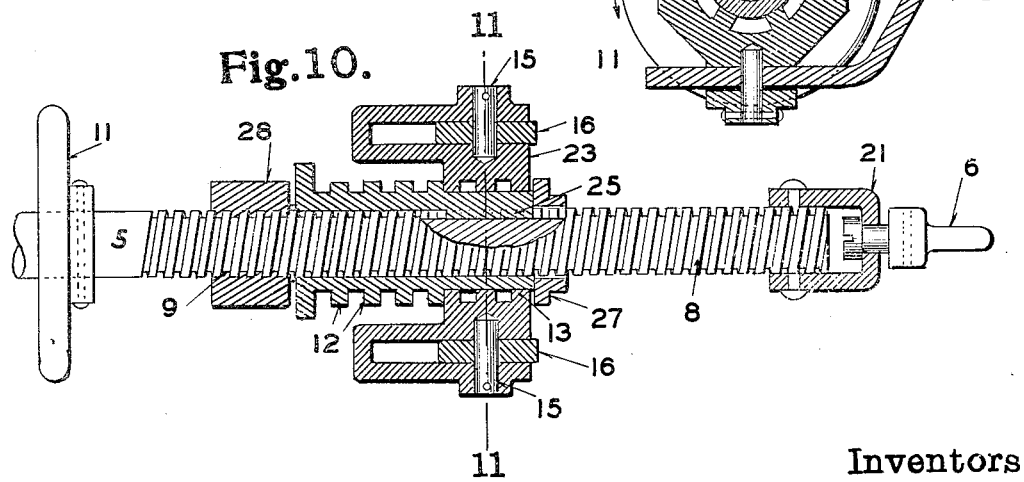
Inventors
F. H. Pietzsch
S. H. Campbell
By E. C. Huffman
Att'y.

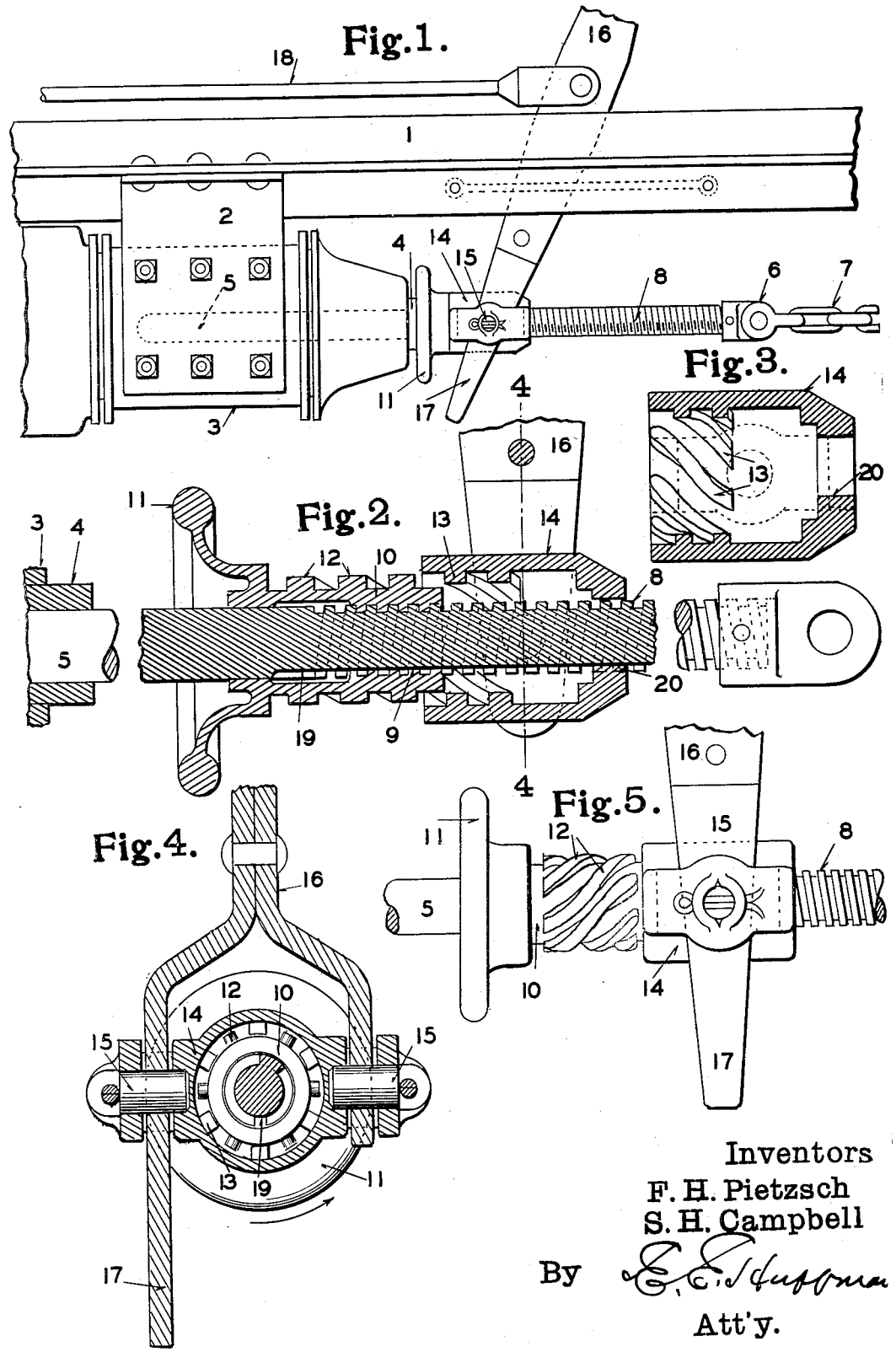

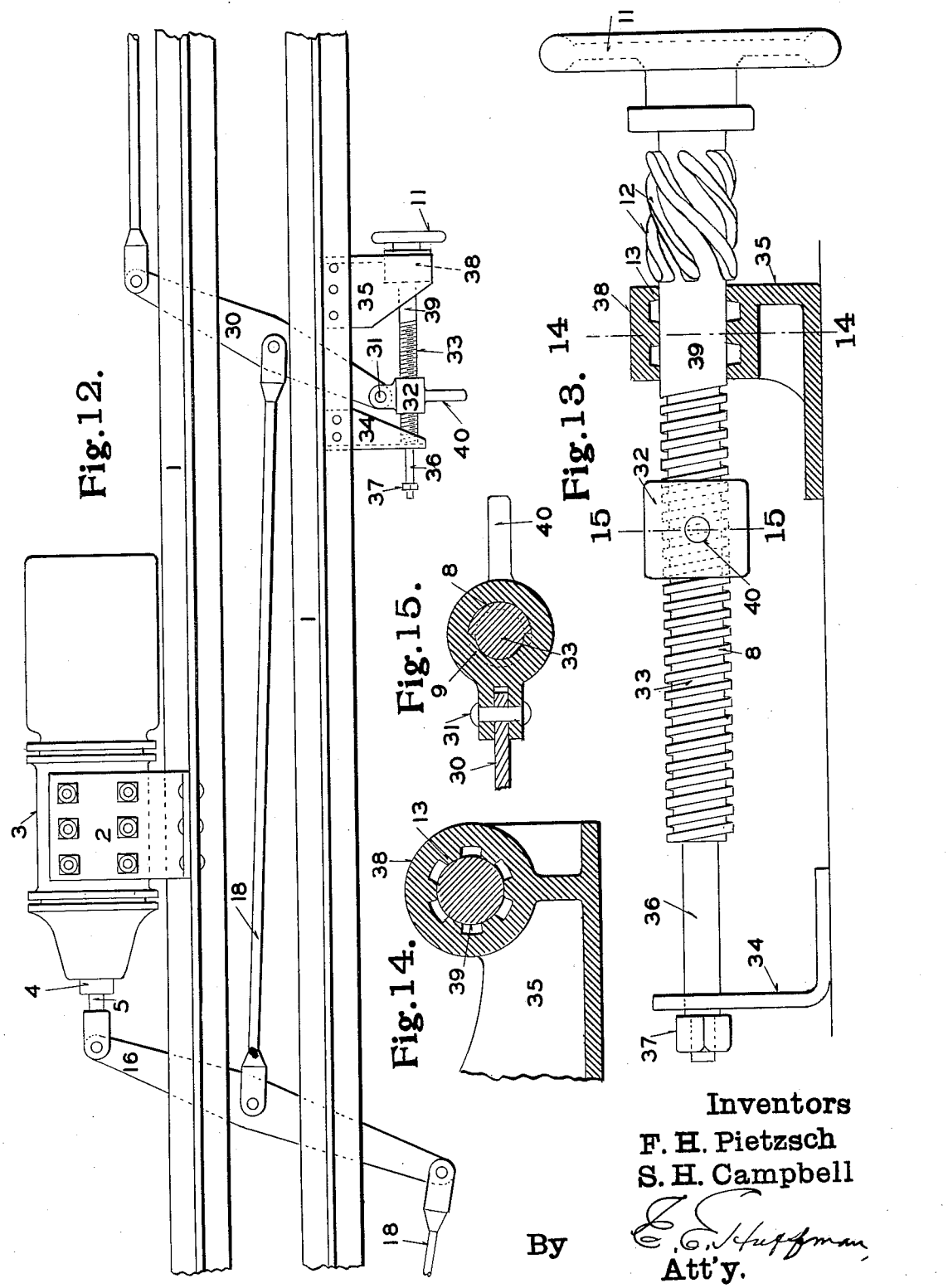

Patented June 26, 1934

1,964,137

UNITED STATES PATENT OFFICE 1,964,137

BRAKE SLACK ADJUSTER

Frank H. Pietzsch and Sterling H. Campbell, St. Louis, Mo., assignors to Railway Devices Company, St. Louis, Mo., a corporation of Missouri Application December 24, 1931, Serial No. 582,954

9 Claims. (Cl. 188—197)

Our invention relates to a brake slack adjuster and particularly to that type of adjuster in which the slack is taken up by the relative rotary movement of two parts having threaded engagement, such for example, as that shown in our application Serial No. 426,240, filed February 6, 1930.

The object of our invention is to provide means for introducing into the braking system a predetermined minimum of slack to prevent dragging of the brake shoes on the wheels when the brakes are in released position.

Heretofore various constructions have been devised to prevent the removal of all slack from braking systems when the slack is taken up, but all such constructions, as far as we are aware, have been applicable only to slack adjusters depending upon rack and pawl, pin and hole, or similar sliding connections. In such devices, not only is the adjusting means liable to disengagement from shock or vibration, but the retention of the minimum amount of slack depends upon the proper manipulation of the device when the slack is taken up and may not be secured by trainmen unfamiliar with the device. With our device it is impossible to avoid introducing the desired slack into the braking system and the adjustment is not liable to accidental derangement by either shock or vibration.

In the accompanying drawings, which illustrate some forms of slack adjusters made in accordance with our invention, Figure 1 is a top plan view; Figure 2 is an enlarged view, partly in section, of the push-bar and its associated parts; Figure 3 is a detached sectional view of the sleeve; Figure 4 is a section taken on the line 4—4 of Figure 2; Figure 5 is a fragmentary top plan view showing the tubular member disengaged from the sleeve; Figure 6 is a view similar to Figure 1 but showing a modification; Figures 7, 8 and 9 are detached views of parts shown in Figure 6, Figure 7 being partly in section; Figure 10 is an enlarged plan view, partly in section, of the push-bar and associated parts shown in Figure 6; Figure 11 is a section taken on the line 11—11 of Figure 10; Figure 12 is a top plan view of a further modification; Figure 13 is an enlarged side view, partly in section, of the adjusting means shown in Figure 12; Figure 14 is a section taken on the line 14—14 of Figure 13; and Figure 15 is a section taken on the line 15—15 of Figure 13.

Referring first to Figures 1 to 5, inclusive, 1 indicates part of the under frame of a railway car having secured to it by means of a bracket 2, a brake cylinder 3. The brake cylinder is provided with a piston rod 4 and a telescoping push-bar 5. This push-bar is connected with the brake lever system, as will be hereinafter described, and is attached by means of a clevis 6 with a chain 7 leading to the hand-brake mechanism (not shown). The outer end of the push-bar is provided with threads 8 engaging with corresponding threads 9 on the interior of a tubular member 10 which thus forms the adjusting nut. The member 10 is provided at one end with a hand wheel 11 and has on its periphery coarse multiple threads 12. Engaging with the threads 12 are corresponding threads 13 on the interior of a sleeve 14. The pitch of the threads 12 and 13 is such (preferably approximately 45 degrees) that the sleeve and tubular members may be disengaged by a rotary motion and re-engaged by longitudinal thrust. The pitch of threads 12 and 13 is inclined in the opposite direction to that of the threads 8 and 9. In the drawings we have shown the former threads as of left-hand pitch and the latter as of right-hand pitch, but the pitches may be reversed if desired.

The sleeve 14 is pivoted by means of pins 15, to the bifurcated end of the cylinder lever 16, one of the sides of the bifurcated part being extended to form a handle 17. The lever 16 is connected by top rods 18 (only one of which is shown in Figure 1) to the duplicate brake lever system of the car. In order to prevent the rotation of the push-bar and consequent twisting of the chain 7, we provide the bar with a key way 19 engaging with a key 20 in the forward end of the sleeve.

In the operation of our device, when it is desired to take up the slack, the wheel 11 is rotated in the direction indicated by the arrow in Figure 4. The first effect of such rotation is to disengage the tubular member from the sleeve, as shown in Figure 2. Continued rotation of the tubular member carries said member along the push-bar, propelling the sleeve before it, until all the slack is taken up. It will be understood that the slack is taken up while the push-bar is in its extreme retracted position, as shown in Figure 1. As soon as the push-bar is moved forward, either by the action of the brake cylinder or the hand brake, the threads 12 will reenter the sleeve, thus permitting a predetermined amount of movement and so restoring to the system the desired amount of slack. In order that this re-entry movement may not be even temporarily prevented by the seating of the ends of the threads 12 against the ends of the threads 13, the adjacent ends of these sets of threads are rounded, as shown in Figures 3 and 5.

In Figures 6 to 11, inclusive, we have shown a modification in which the push-bar is rotated to take up the slack. In this modification the hand wheel 11 is secured to the push-bar and a swivel joint 21 is interposed between the clevis and the push-bar so that the chain will not be twisted when the bar is rotated. The cylinder lever is pivoted by pins 15 to a sleeve 23, differing slightly in form from the sleeve 14. The threads 13 of this sleeve engage with the threads 12 of a tubular member 24 which extends beyond the threads 12 a distance at least equal to the length of the sleeve to form a bearing rotatable freely in the sleeve. This tubular member has no interior threads but is provided with a key 25 entering the key way 19 in the push-bar so that the tubular member may slide along the bar but is incapable of rotary movement relative thereto. The push-bar is surrounded by a yoke 26 having end pieces 27 and 28, the latter of which is provided with threads 9 so as to form the adjusting nut. In this form of device the fine, or adjusting threads 8 and 9 are inclined in the same direction as the coarse, or cam threads 12 and 13. In the drawings we have shown both as left-hand threads so that the hand wheel is rotated in the same direction to take up the slack as in the form previously described. Both sets of threads, however, may have right-hand pitch if desired.

The operation of this form of adjuster is as follows: when the hand wheel is rotated, the push-bar itself is rotated together with the tubular member which is keyed thereto. The first effect of the rotation is to move the sleeve from the position shown in Figure 6, to that shown in Figure 10, by the cam action of the threads 12 and 13. After the sleeve has reached this position, the unthreaded portion of the tubular member can rotate freely in the sleeve so that the sleeve, tubular member, and yoke are all moved together along the push-bar until the slack is removed. The desired slack is restored, as in the previous form, by the re-entry of the threaded parts of the tubular member into the sleeve.

In both forms above described, the adjustment is secured between the cylinder and the cylinder lever. In Figures 12 to 15, inclusive, we have shown a modification in which the adjustment is secured by varying the pivot point of one of the levers of the brake lever system. This lever 30 of the brake lever system, which is connected to the cylinder lever by one of the top rods 18, is pivoted at 31 to a nut 32 threaded to engage the fine or adjusting threads 8 of an adjusting bar 33 carried in brackets 34 and 35 mounted on the under frame. One end of the adjusting bar is provided with a reduced portion 36 sliding in the bracket 34 and engaging a stop nut 37. The other end of the bar is provided with a hand wheel 11 adjacent to which are the coarse or cam threads 12 normally engaging with threads 13 on the interior of a hub 38 which thus performs the function of the sleeve in the forms heretofore described. Between the threads 8 and 12, the bar is provided with an unthreaded portion 39 adapted to rotate freely in the hub. The nut may be provided with a handle 40. In this form, as in the form shown in Figure 1, the pitch of the cam threads is in the opposite direction to that of the adjusting screw threads.

In the operation of this form of device the rotation of the wheel 11 first withdraws the threads 12 from the hub, bodily moving the adjusting bar together with the nut, away from the bracket 34, as shown in Figure 13. Further rotation of the bar carries the nut along the bar until all slack is removed. The re-entry of the cam threads 12 into the hub, allows the bar to move a predetermined distance toward the left, carrying the pivot point of the lever with it, and so restoring the desired amount of slack into the system. In all forms of the device the operation of taking up the slack may be expedited by pulling the handle in the direction to take up the slack, thus permitting of more rapid operation of the rotating parts than would otherwise be possible.

The handle also provides means for holding the ends of the threads 12 out of contact with the threads 13 in case it is desired to operate the adjusting device in the reverse direction.

Both the cam threads and the adjusting threads provide power multiplying means for moving the weight of the brake lever system when taking up the slack so that this operation may be performed by one hand of the trainman while the other grasps some portion of the car so that he may avoid assuming a dangerous position under the car.

Another advantage of our adjuster is that when the parts are in normal position, the adjustment is positively locked against movement in a direction to introduce slack into the system.

Having fully described our invention, what we claim as new and desire to secure by Letters Patent of the United States is:

1. In a device of the class described, a brake cylinder, a threaded push-bar operated by said cylinder, a threaded member engaging said push-bar, a cylinder lever, and a sleeve carried by said lever and having camming means permitting relative movement between said lever and push-bar to retain slack in the braking system.

2. In a device of the class described, a brake cylinder, a cylinder lever, a threaded push-bar operated by said cylinder, a rotary threaded member mounted on said push-bar and provided with camming means, and a sleeve on said cylinder lever cooperating with said camming means to retain slack in the braking system.

3. In a device of the class described, a brake cylinder, a cylinder lever, a threaded push-bar operated by said cylinder, a rotary tubular member having threaded engagement with said push-bar and provided with camming threads of opposite pitch to the threads on said push-bar, and a sleeve carried by said cylinder lever and provided with camming threads cooperating with the camming threads on said rotary member.

4. In a device of the class described, a brake cylinder, a cylinder lever, a threaded push-bar operated by said cylinder, a rotary threaded member on said push-bar provided with camming means, and a sleeve carried by the cylinder lever and cooperating with said camming means, said sleeve having engagement with the push-bar preventing relative rotary movement between said parts but allowing relative longitudinal movement thereof.

5. In a device of the class described, a brake cylinder, a cylinder lever, a threaded push-bar operated by said cylinder, a tubular member threaded on said lever, said member being provided with a hand-wheel and with camming means, and a sleeve provided with camming means cooperating with said first named camming means and having a key engaging a key way in the push-bar.

6. In a device of the class described, a brake cylinder, a cylinder lever, a rotary threaded push-bar operated from said cylinder, a tubular member mounted on said push-bar to move longitudinally thereof but be incapable of relative rotary movement with respect thereto, camming means on said tubular means, a nut in which said push-bar rotates to take up the slack, and a sleeve secured to the cylinder lever and provided with camming means cooperating with the camming means on said tubular member.

7. In a device of the class described, a brake cylinder, a cylinder lever, a rotary threaded push-bar operated from said cylinder, a tubular member mounted on said push-bar to move longitudinally thereof but be incapable of relative rotary movement with respect thereto, camming means on said tubular member, a yoke on said push-bar and embracing said tubular member, said yoke being provided with threads forming a nut for said push-bar, and a sleeve carried by said cylinder lever and provided with camming means cooperating with the camming means on said tubular member.

8. A slack adjusting device for brake systems comprising a threaded rod, a sleeve having internal threads engaging with the threads on said rod, external threads on said sleeve of different pitch than the internal threads, manually operated means for rotating one of said parts to take up slack, and a nut engaging with the external threads of said sleeve and movable relatively thereto to restore a predetermined minimum of slack to the brake system.

9. A slack adjusting device for brake systems comprising a threaded rod, a sleeve having internal threads engaging with the threads on said rod, external threads on said sleeve of greater pitch than the internal threads, manually operated means for rotating the sleeve to take up slack, and a nut engaging with the external threads of said sleeve and movable relatively thereto to restore a predetermined minimum of slack to the brake system.

FRANK H. PIETZSCH.
STERLING H. CAMPBELL.